Aug. 27, 1957   J. F. HALLER ET AL   2,804,376
PROCESS FOR PRODUCTION OF HYDROGEN PEROXIDE
Filed July 12, 1952
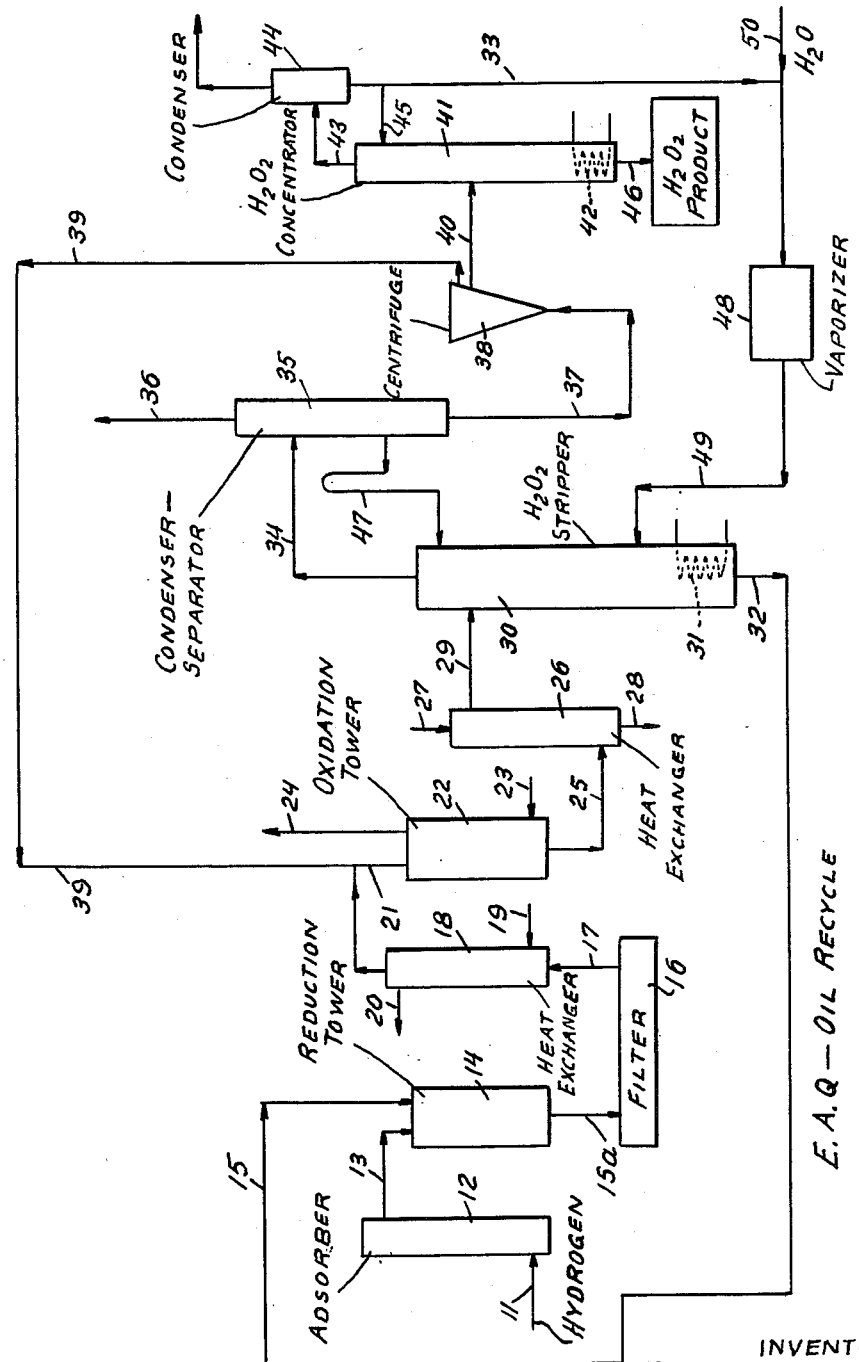
INVENTORS
JOHN F. HALLER
THEODORE M. JENNEY
JOHN W. CHURCHILL
BY
Adams, Forward and McLean
ATTORNEYS

United States Patent Office 2,804,376
Patented Aug. 27, 1957

2,804,376
PROCESS FOR PRODUCTION OF HYDROGEN PEROXIDE

John F. Haller, Niagara Falls, and Theodore M. Jenney and John W. Churchill, Kenmore, N. Y., assignors to Olin Mathieson Chemical Corporation, a corporation of Virginia Application July 12, 1952, Serial No. 298,642

15 Claims. (Cl. 23—207)

Our invention relates to improvements in the production of hydrogen peroxide utilizing a substituted anthraquinone as an intermediate through successive reduction and oxidation steps. More particularly, it provides a method for recovery of hydrogen peroxide by distillation and purification which facilitates recirculation of the intermediate with economy and safety within the system, thus providing a cyclic process susceptible of continuous operation.

In the manufacture of hydrogen peroxide by the use of alkyl anthraquinones as intermediates, a solution of the intermediate in a suitable solvent is first reduced partially to hydroquinone and the reduced solution is treated with air or other oxygen-bearing gas. The oxidation of the intermediate reforms the anthraquinone and produces hydrogen peroxide. The latter is removed from the intermediate solution usually by washing with water and the aqueous extracts are concentrated to obtain hydrogen peroxide of the desired strength. The washed solution of intermediate is treated to remove residual hydrogen peroxide, dried and recycled to the hydrogenation stage.

Various alkyl anthraquinones have been proposed as intermediates in this process including particularly 2-methylanthraquinone, 2-isopropylanthraquinone and 2-tertiary-butylanthraquinone, but 2-ethylanthraquinone is preferred. Mixtures of these anthraquinones may also be used.

As solvents, mixtures of benzene and higher alcohols, such as cyclohexanol, have been proposed, but to avoid vapor losses and the hazard of explosive vapor mixtures, tetralin and methylcyclohexanol are preferred. Usually a hydrocarbon solvent is necessary to obtain adequate solubility of the anthraquinone and a more polar compound such as an alcohol is necessary in order to dissolve the substituted hydroquinone. Other considerations in selection of the solvent are water immiscibility including sufficient density difference for clean settling, inertness with respect to the other chemical components of the system under conditions of hydrogenation and oxidation and safety in the sense of not forming organic hydroperoxides under the reaction conditions.

As catalyst for the hydrogenation step, Raney nickel is commonly used. However, as described in copending application Serial No. 298,641, filed July 12, 1952, of John F. Haller, a preferable catalyst is palladium or platinum deposited on alumina which advantageously is applied in the form of a fixed bed under hydrogenation conditions of pressure and temperature and flow rate so that partial reduction to the extent of about 50 to 75% is obtained in a cyclically operated process. In general about 0.5 to 1% of palladium on a support is used. The support preferably comprises a narrow range of particles between about 20 and about 100 mesh, for example 40 to 50 mesh.

The oxidation of the partially reduced intermediate may be accomplished by simple contact with air or oxygen, but as described in the above Haller application, oxidation is effected by securing in-line liquid flow through a suitably packed oxidizing tower with countercurrent or concurrent oxidizing gas contact at about 40° to 50° C. and 15 to 300 p. s. i. a.

Where the prior art has found it necessary to recover the hydrogen peroxide formed from the intermediate by water extraction in a system usually requiring at least 3-contact stages followed by a concentrating operation, we have found that the hydrogen peroxide can be efficiently and safely stripped from the intermediate by distillation. Indeed we have found that subjecting the oxidized oil to distillation under conditions of reduced pressure in the presence of steam, not only effectively strips the hydrogen peroxide from the intermediate quickly so that yields based on theory are high but that all organic peroxides formed are removed with the liquid bottoms fraction and hence by recycle to the reduction step are safely decomposed. We have found that the distillation column is most advantageously operated by vaporizing all the water and peroxide together with some solvent which after condensation and separation is recycled as reflux to the distillation tower. The distillation conditions require a temperature within the range of about 75° to 105° C. at a pressure of 5 to 65 mm. of mercury, more advantageously 90° to 100° C. and 25 to 60 mm. of mercury. Extraneously heated steam supplies part of the required heat and acts as a stripping agency.

The process of the present invention in preferred form comprises a continuous cyclic operation including the steps of reducing the intermediate-oil solution partially to the hydroquinone, oxidizing the partly reduced intermediate solution with air or oxygen and stripping the hydrogen peroxide therefrom under distillation conditions of reduced pressure. Subsequently the hydrogen peroxide may be further concentrated if desired. The stripped intermediate solution recovered as liquid bottoms is recycled to the hydrogenation zone for reuse. The hydrogen peroxide solution recovered overhead from the stripping zone carries with it a portion of entrained solvents which are separated suitably by a centrifuge. The solvents are returned to the system and the clarified peroxide is charged to a concentrator. The water removed overhead contains minor proportions of hydrogen peroxide and is preferably recycled to the stripping zone. The dissolved solvents are stripped from the clarified peroxide in the concentrator by providing a sufficient number of plates to reduce the solvent in the tower bottoms to less than one part per million. This requires about 4 theoretical plates.

We have found that our system of hydrogen peroxide recovery by polyphase extractive distillation of peroxide-anthraquinone-solvent-water at elevated temperature and reduced pressure is capable of safe, efficient operation despite the warnings in the art that the heat-time requirements of anthraquinone stripping by distillation would make peroxide losses prohibitive and that peroxide distillation in the presence of an organic invited explosion. On the contrary, we have found that concentration of organic hydroperoxides in the bottoms contributes to safety and results in a peroxide product of higher purity than that obtainable by conventional water extraction methods. The use of steam stripping with total peroxide-water overhead with solvent reflux provides short tower time factors minimizing decomposition losses. In the production of high concentration peroxide, it is advantageous to charge the aqueous peroxide recovered from the anthraquinone intermediate by the stripping operation to a second low pressure distillation operation in which the peroxide is concentrated by boiling water overhead which advantageously is recovered and recycled as stripping steam to the stripping recovery operation.

A particular advantage of the distillation recovery process is its susceptibility to integration with continuously operated reduction and oxidation steps to form a continuous flexible cyclic system in which requirements of materials, heat and equipment are economized.

The simplified flow sheet of the accompanying drawing will serve to explain the present process in greater detail. Various sources of hydrogen are suitable for the reduction step, but it is particularly advantageous to use electrolytic hydrogen. Where this hydrogen is derived from a mercury cell, it may contain traces of mercury which act deleteriously on the hydrogenation catalyst and which should be removed. Suitably the hydrogen is introduced by line 11 to an adsorbent column 12 packed with activated carbon or other suitable adsorbent. Effluent purified hydrogen passes by line 13 under suitable pressure to reduction tower 14 which is supplied with stripped intermediate-oil solution by recycle line 15. Tower 14 is packed with the hydrogenation catalyst on a granular support. The reduced solution flows by line 15a to filter 16 which may be provided to insure removal of any fine particles of hydrogenation catalyst entrained in the oil. The reduced oil, heated by the hydrogenation reaction, passes by line 17 to heat exchanger 18 where it is cooled to a suitable temperature for oxidation. For this purpose water is introduced to the heat exchanger by line 19 and leaves by line 20. The cooled oil passes by line 21 to oxidizer 22 which is a tower suitably packed, for example, with porcelain Berl saddles to provide intimate contact between the oil and air introduced by line 23. The air is vented from the oxidation tower 22 by line 24 while the oxidized oil passes by line 25 to heat exchanger 26. The oxidation reaction is also exothermic, but it is necessary to supply additional heat for the hydrogen peroxide recovery process. Heat may be supplied by introducing steam to heat exchanger 26 via line 27 and removing steam condensate by line 28. The heated oil passes by line 29 to stripper 30 which is maintained, for example, under a reduced pressure of about 60 mm. of mercury with a top temperature of about 100° C. The necessary additional heat is supplied, for example, by steam coils 31. The stripped oil is recycled via lines 32 and 15 to hydrogenaton tower 14. It is cooled enroute by suitable heat exchange (not shown) and delivered to the reduction tower 14 at a temperature appropriate for the hydrogenation.

Hydrogen peroxide, somewhat diluted by stripping steam introduced by line 49 near the bottom of the stripper, is taken overhead via line 34. The overhead also contains a portion of vaporized solvent. Condenser-separator 35 is interposed between the vacuum line 36 and stripping column 30 to condense the overhead. Vaporized solvent is returned via line 47 to stripping tower 30 and the aqueous phase is charged via line 37 to centrifuge 38. The lighter layer of solvent is returned via line 39 to oxidizer 22. Aqueous hydrogen peroxide from the centrifuge 38 passes via line 40 to concentrator 41 which is heated, for example, by steam coil 42. The concentrator 41 may be operated, for example, at a reduced pressure of about 50 mm. of mercury, and overhead water, together with remaining solvent, is removed via line 43 to condenser 44 interposed between the concentrator and the vacuum system. A portion of the water is returned via line 45 as reflux to the concentrator and the remaning water, containing some solvent is returned via line 33 to vaporizer 48 and thence via line 49 to stripping tower 30. Make-up water may be added to line 33 as necessary by line 50. Effluent hydrogen peroxide product is removed by line 46 from the bottom of concentrator 41.

In the system delineated by the attached flow sheet, it is advantageous to arrange part of the equipment in duplicate in order to make the continuous flow more uniform. Thus using mercury cell hydrogen it is advantageous to provide two activated carbon adsorbing towers since it is occasionally necessary to regenerate the adsorbent in place or to remove and replace the adsorbent. While this is being done the flow of gas passes through the second tower. For similar reasons it is advantageous to arrange two reduction towers in parallel since it is necessary at infrequent intervals to replace or regenerate the hydrogenation catalyst. The filter 16 also may be provided in duplicate to avoid interrupting the process when it is necessary to remove accumulated sludge from the filter. When the plant is sufficinetly large, it is also necessary to provide duplicate strippers arranged in parallel due to the limited commercially available sizes of ceramic towers preferable for this service.

To avoid decomposition of hydrogen peroxide, stripper 30, condenser 35, concentrator 41 and condenser 44 are preferably of glass or ceramic lined construction. In the operations preceding the stripper, stainless steel is a preferred material of construction for the equipment and No. 316 is most suitable. No. 304 and No. 347 may also be used and glass or glass lined equipment is satisfactory. The adsorber towers, when used for the purification of mercury cell hydrogen, can be of plain steel. Aluminum is satisfactory for final storage of hydrogen peroxide.

In an illustrative operation, a solution of about 12 parts of ethyl anthraquinone, 44 parts by weight of methylcyclohexanol and 44 parts of tetralin is used as the intermediate solution. It is recycled at a temperature of about 50° C. to the reduction tower 14 packed with a catalyst comprising about 0.5% of palladium deposited on about 40 mesh alumina particles. Hydrogen pressure is maintained in the reduction tower at about 65 p. s. i. a. The heat of hydrogenation raises the temperature of the intermediate solution to about 60° C. and it contains about 7% of hydroquinone and 5% of ethyl anthraquinone representing about 60% reduction. Because of the heat evolved in the oxidation step it is necessary to cool the oil to about 40° C. at which temperature it is charged to the top of oxidation tower 22. Air is cleaned, compressed and introduced into the bottom of the oxidation tower, suitably through a diffuser. Alternatively the air and oil may flow concurrently. The effluent oil from the bottom of the oxidizer contains about 0.1% of unoxidized hydroquinone, the remainder having been oxidized to ethyl anthraquinone. In addition, the oil contains about 1% of hydrogen peroxide.

To remove hydrogen peroxide from the oxidized oil it is heated to about 90° C. and introduced into a stripping tower about two plates from the top. A top temperature of about 100° C. and a pressure of 60 mm. are maintained. Recycle water or steam is introduced at the bottom of the tower and heat is supplied to maintain the top temperature. The overhead distillate comprises two phases; the water phase is about 20% hydrogen peroxide and the oil phase about 2% hydrogen peroxide. The oil phase is recycled as reflux and the water phase is removed. The entrained oil is centrifuged from the dilute peroxide and recycled to the process. The 20% peroxide is charged to a concentrator operating at a top temperature of about 40–45° C. and a pressure of 50 mm. of mercury. Additional methyl cyclohexanol and water is removed overhead and a suitable proportion is returned to the concentrator as reflux, the remainder being returned to the stripping tower. Concentrated peroxide, for example about 50%, is removed from the bottom of the concentrator as product.

In the most advantageous application of our invention, as a continuous cyclic process, conditions of concentration, temperature and flow rate are closely interrelated, and the operation of each step depends upon operation in each of the other steps. Thus the concentration of intermediate in the oil solution, hydrogen pressure, and catalyst activity are controlled in the reduction step to produce an effluent suitable for charging to the oxidizer.

The latter is controlled to provide a suitable charge for the stripping unit.

In general, in the reduction step temperatures of from room temperature to about 80° C. or somewhat higher may be used but a range of about 50° C. to 80° C. is preferred. At lower temperatures the reactions may be inconveniently slow and at higher temperatures excessive hydrogen peroxide losses occur. When the recycle oil is supplied to the reducer at about 50° C. and hydrogen pressure is maintained at about 60–70 p. s. i. a., the effluent reduced oil at a temperature of about 60° C. will contain about 50 to 70% of intermediate in the form of hydroquinone. Further reduction may cause separation of the hydroquinone, and it is generally advantageous to avoid reduction of more than about 65% of the intermediate in the solvent.

The oxidizer may suitably operate at about the same temperature range as the reducer in order to obtain good yields of hydrogen peroxide without excessive side reaction of the intermediate. Proper equilibrium operation of the stripper and concentrator depends on maintaining the indicated temperatures and pressures in a steady state. When the oxidizer is operated to produce an effluent containing about 1% of hydrogen peroxide, the pressure and temperature conditions in the stripper and concentrator can be readily integrated and maintained in equilibrium. Any considerable fluctuation in the operation of the oxidizer however may materially upset operation in the stripper and concentrator and interfere with the production of satisfactory product in the best yield.

We claim:

1. In the production of hydrogen peroxide from an alkyl anthraquinone by reduction of the anthraquinone in solution with hydrogen in the presence of a reduction catalyst followed by oxidation of the reduced solution, the method of recovering hydrogen peroxide from the oxidized solution and concentrating it which comprises subjecting the oxidized solution to distillation in a tower in the presence of stripping steam at a top temperature within the range of about 70° to 105° C. under a reduced pressure within the range of about 5 to 65 mm. of mercury such that substantially all of the peroxide and water is vaporized from the distillation system and the bulk of the organic solution is separated from the distillation system as a liquid fraction for recycle, subjecting aqueous peroxide recovered from the first distillation to redistillation at reduced pressure and an elevated temperature boiling water overhead, recovering the water overhead fraction and returning it as stripping steam to the first distillation, and recovering a concentrated hydrogen peroxide product as a higher boiling fraction in the redistillation operation.

2. The method of claim 1 in which the anthraquinone is 2-ethyl anthraquinone.

3. The method of claim 1 in which the solvent comprises a mixture of tetralin and methyl cyclohexanol.

4. The method of claim 1 in which the temperature is within the range of about 90° to 100° C. and the pressure within the range of about 25 to 60 mm. of mercury.

5. The method of claim 1 in which the reduction is carried out in a tower under partial reduction conditions of temperature and pressure in the presence of a particle form reduction catalyst comprising a metal selected from the group consisting of palladium and platinum on alumina.

6. In the production of hydrogen peroxide from an alkyl anthraquinone by reduction of the anthraquinone in solution in a solvent with hydrogen in the presence of a reduction catalyst followed by oxidation of the reduced solution, the method of recovering hydrogen peroxide from the oxidized solution which comprises subjecting the oxidized solution to distillation in a tower in the presence of stripping steam at a top temperature within the range of about 70° to 105° C. under a reduced pressure within the range of about 5 to 65 mm. of mercury such that substantially all of the peroxide and water is vaporized together with a portion of the solvent in a vapor fraction from the distillation system and the bulk of the organic solution is separated from the distillation system as a liquid fraction for recycle, condensing the vapor fraction, separating the resulting condensate into a solvent phase and an aqueous phase, returning the solvent from the solvent phase to the distillation system as reflux and recovering hydrogen peroxide from the aqueous phase.

7. The method of claim 6 in which the anthraquinone is 2-ethyl anthraquinone.

8. The method of claim 6 in which the solvent comprises a mixture of tetralin and methyl cyclohexanol.

9. The method of claim 6 in which the temperature is within the range of about 90° to 100° C. and the pressure within the range of about 25 to 60 mm. of mercury.

10. The method of claim 6 in which the reduction is carried out in a tower under partial reduction conditions of temperature and pressure in the presence of a particle form reduction catalyst comprising a metal selected from the group consisting of palladium and platinum on alumina.

11. A cyclic process for the production of hydrogen peroxide from an alkyl anthraquinone which comprises reducing a solution of the alkyl anthraquinone in a solvent with hydrogen in the presence of a reduction catalyst, oxidizing the reduced solution by contact with an oxygen-bearing gas, subjecting the oxidized solution to distillation in a tower in the presence of stripping steam at a top temperature within the range of about 70° to 105° C. under a reduced pressure within the range of about 5 to 65 mm. of mercury such that substantially all of the peroxide and water is vaporized together with a portion of the solvent in a vapor fraction from the distillation system and the bulk of the organic solution is separated from the distillation system as a liquid fraction, recycling the solution recovered as the liquid fraction from the distillation system to the reduction step, condensing the vapor fraction, separating the condensate into a solvent phase and an aqueous phase, returning the solvent from the solvent phase to the distillation system as reflux and recovering hydrogen peroxide from the aqueous phase.

12. The method of claim 11 in which the solvent comprises a mixture of tetralin and methyl cyclohexanol.

13. The method of claim 11 in which the anthraquinone is 2-ethyl anthraquinone.

14. The method of claim 11 in which the distillation temperature is within the range of about 90° to 100° C. and the pressure is within the range of about 25 to 60 mm. of mercury.

15. The method of claim 11 in which the reduction is carried out in a tower under partial reduction conditions of temperature and pressure in the presence of a particle form reduction catalyst comprising a metal selected from the group consisting of palladium and platinum on alumina.

References Cited in the file of this patent

UNITED STATES PATENTS

| | | |
|---|---|---|
| 2,158,525 | Riedl et al. | May 16, 1939 |
| 2,169,128 | Schmidt | Aug. 8, 1939 |
| 2,215,833 | Riedl et al. | Sept. 24, 1940 |
| 2,282,184 | Harrower et al. | May 5, 1942 |
| 2,369,912 | Pfleiderer et al. | Feb. 20, 1945 |
| 2,689,169 | Hinegardner | Sept. 14, 1954 |